(12) United States Patent
Ofir

(10) Patent No.: US 12,504,566 B2
(45) Date of Patent: Dec. 23, 2025

(54) TRANSPARENT CONDUCTIVE DIFFRACTIVE GRATINGS FOR OPTICAL ELEMENTS OF AUGMENTED REALITY AND VIRTUAL REALITY DISPLAYS

(71) Applicant: Adeia Guides Inc., San Jose, CA (US)

(72) Inventor: Yuval Ofir, Kfar Ha-Oranim (IL)

(73) Assignee: Adeia Guides Inc., San Jose, CA (US)

( * ) Notice: Subject to any disclaimer, the term of this patent is extended or adjusted under 35 U.S.C. 154(b) by 618 days.

(21) Appl. No.: 17/744,936

(22) Filed: May 16, 2022

(65) Prior Publication Data

US 2023/0367046 A1   Nov. 16, 2023

(51) Int. Cl.
  G02B 5/18   (2006.01)
  F21V 8/00   (2006.01)
  G02B 27/01  (2006.01)

(52) U.S. Cl.
  CPC ............ *G02B 5/18* (2013.01); *G02B 5/1814* (2013.01); *G02B 5/1861* (2013.01); *G02B 6/0043* (2013.01); *G02B 27/0172* (2013.01)

(58) Field of Classification Search
  None
  See application file for complete search history.

(56) References Cited

U.S. PATENT DOCUMENTS

| | | | |
|---|---|---|---|
| 10,935,730 B1 | 3/2021 | Lou et al. | |
| 12,259,554 B2 | 3/2025 | Ofir | |
| 2009/0303565 A1* | 12/2009 | Karmhag | G02F 1/1533 359/265 |
| 2012/0086949 A1* | 4/2012 | Gao | G02B 26/001 359/566 |
| 2018/0081176 A1 | 3/2018 | Olkkonen et al. | |
| 2018/0299678 A1* | 10/2018 | Singer | G02B 6/005 |
| 2019/0056591 A1 | 2/2019 | Tervo et al. | |
| 2019/0339449 A1 | 11/2019 | Shipton et al. | |
| 2020/0018875 A1 | 1/2020 | Mohanty et al. | |
| 2020/0158942 A1 | 5/2020 | Yang et al. | |
| 2020/0285145 A1 | 9/2020 | Watkins et al. | |
| 2021/0063634 A1 | 3/2021 | Waldern et al. | |

(Continued)

FOREIGN PATENT DOCUMENTS

| | | |
|---|---|---|
| EP | 3443402 A1 | 2/2019 |
| WO | 2005024491 A1 | 3/2005 |
| WO | 2017/180403 A1 | 10/2017 |

OTHER PUBLICATIONS

Yin, Kun, et al., "Virtual reality and augmented reality displays: advances and future perspectives", Yin, Kun, et al., "Virtual reality and augmented reality displays: advances and future perspectives." 2021 J. phys. Photonics 3 022010.

*Primary Examiner* — Stephone B Allen
*Assistant Examiner* — Tamara Y. Washington
(74) *Attorney, Agent, or Firm* — HALEY GUILIANO LLP

(57) ABSTRACT

Head-mounted displays with waveguides comprising surface relief gratings made of a transparent conductive material and methods for fabricating said waveguides are described herein. In an embodiment, a head-mounted display comprises an optical element and an image source that provides an image beam to an optical element. The optical element comprises a diffractive grating comprising a transparent conductive material. The diffractive grating diffracts light into, through, or out of the waveguide as well as absorbing any light that is not polarized in the direction of the diffractive grating.

20 Claims, 6 Drawing Sheets

(56) References Cited

U.S. PATENT DOCUMENTS

| | | |
|---|---|---|
| 2021/0072534 A1* | 3/2021 | Olkkonen .............. G02B 27/42 |
| 2021/0296859 A1* | 9/2021 | Cheng .................... H01S 5/124 |
| 2021/0311318 A1 | 10/2021 | Lin et al. |
| 2021/0318537 A1 | 10/2021 | Kim et al. |
| 2021/0325778 A1 | 10/2021 | Ceballos et al. |
| 2021/0382212 A1 | 12/2021 | Sell et al. |
| 2022/0019080 A1 | 1/2022 | Schultz |
| 2022/0019081 A1 | 1/2022 | Chien |
| 2022/0137408 A1 | 5/2022 | Bohn et al. |
| 2022/0146831 A1* | 5/2022 | Deng ................. G02B 27/0172 |
| 2022/0236472 A1 | 7/2022 | Schultz et al. |
| 2022/0357579 A1 | 11/2022 | Drazic et al. |
| 2023/0305304 A1 | 9/2023 | Ofir |
| 2023/0384593 A1 | 11/2023 | Ofir |

\* cited by examiner

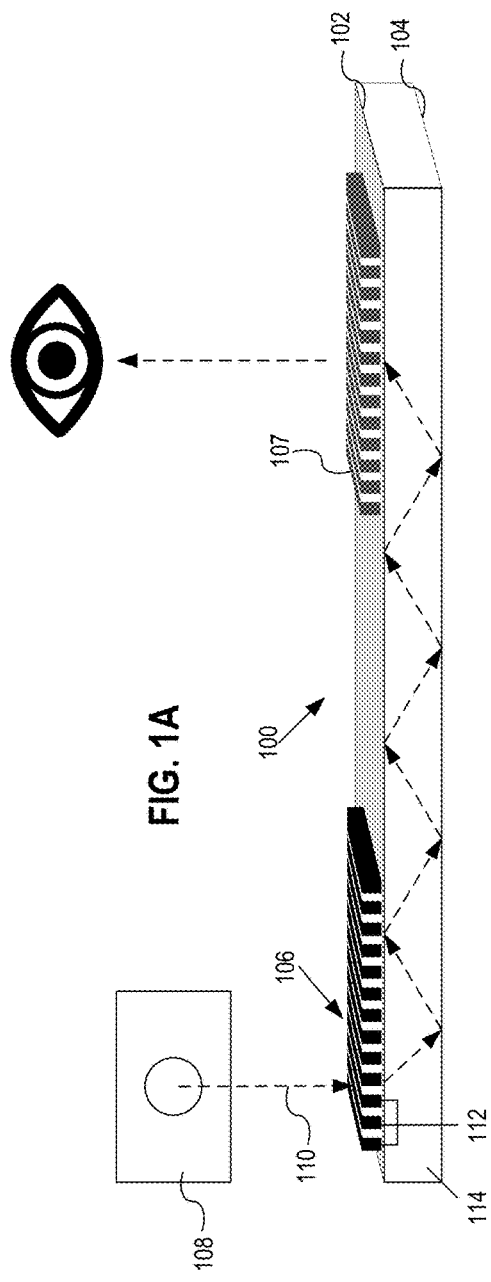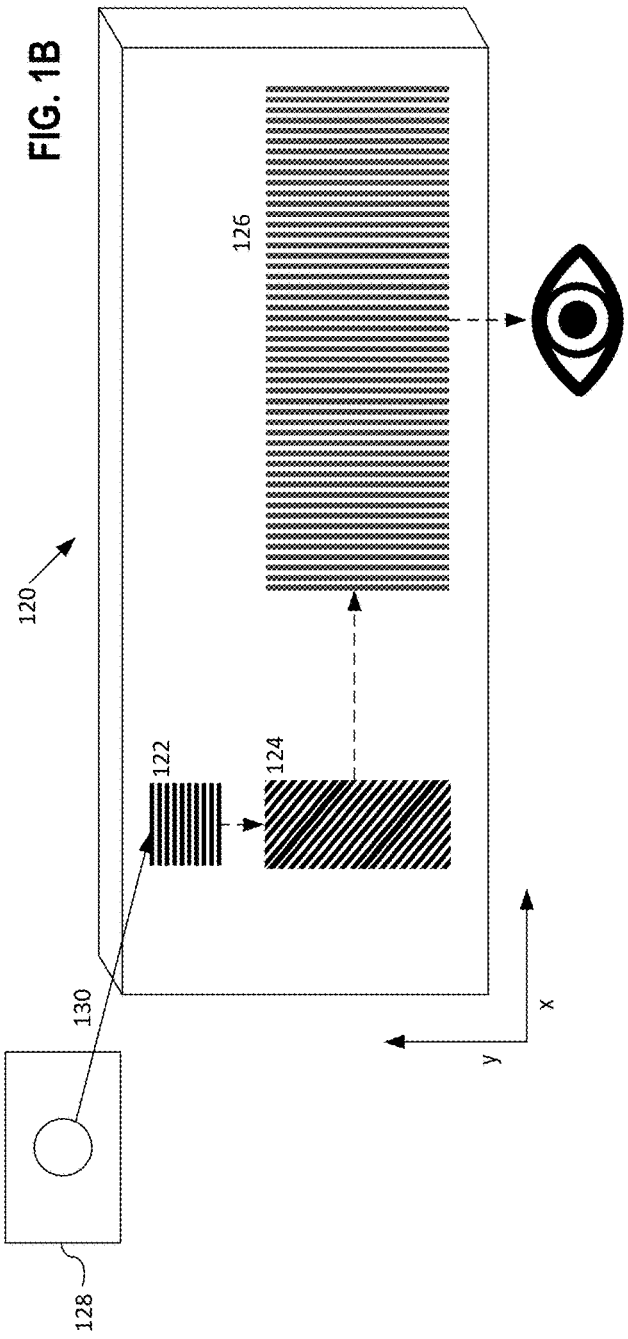

TRANSPARENT CONDUCTIVE DIFFRACTIVE GRATINGS FOR OPTICAL ELEMENTS OF AUGMENTED REALITY AND VIRTUAL REALITY DISPLAYS

FIELD OF THE DISCLOSURE

This disclosure is generally directed to optical elements. In particular, the present disclosure relates to diffractive gratings for use in optical equipment (e.g., for optical devices in augmented and virtual reality displays).

SUMMARY

Virtual reality (VR) and augmented reality (AR) systems are becoming increasingly more common in the modern world. A large focus of modern technology is to create head-mounted displays (HMDs) or near-eye displays (NEDs) that create virtual images in the field-of-view of one or more eyes of a user. Many head-mounted displays, particularly those used for AR, operate by providing an image beam into a waveguide at a specific polarization, which is then propagated through the waveguide and output to an eye of a user.

One issue with VR and AR headsets is stray light within the waveguides. Stray light can be caused by a variety of sources, such as unpolarized light coming from the image source, changes in polarization to some of the light as it reflects through the waveguide, or light from an outside source, such as the sun, entering the waveguide. The issues of stray light are compounded with AR headsets which are intended to be used in diverse environments with different light conditions, including outdoor environments with greater amounts of incident light from the sun or that is bouncing off surfaces around the headset.

To help address the aforementioned problem, in one approach, wire grid polarizers are used to absorb light based on polarization. Wire grid polarizers use sub-wavelength width strips of silver to absorb light in specific polarizations, thereby removing any light that is not polarized in a desired direction. While this approach can remove any light that is not polarized in a specific direction, the fabrication of wire grid polarizers onto a waveguide can be excessively difficult. The wires themselves are very susceptible to warping and the act of applying an adhesive to the wires to attach them to the waveguide can ruin the orientation or straightness of the wires. Additionally, when a waveguide uses surface relief gratings, the available surface area for placing wire grid polarizers is severely reduced.

To overcome such deficiencies of wire grid polarizers and to more effectively address the issue of stray light, head-mounted displays with waveguides comprising surface relief gratings made of a transparent conductive material and methods for fabricating said waveguides are described herein. In an embodiment, a head-mounted display comprises an image source that provides an image beam to an optical element. In this embodiment, the optical element includes a waveguide that comprises a diffractive grating formed at least in part by a transparent conductive material. The diffractive grating diffracts light into, through, or out of the waveguide as well as absorbing light that is not polarized in the direction of the diffractive grating.

In one approach, the transparent conductive material comprises a material designed to absorb light while also comprising a high enough refractive index that it can be used to diffract light. Examples of transparent conductive materials include transparent conductive oxides, such as fluorinated tin oxide (FTO), indium tin oxide (ITO), aluminum zinc oxide (AZO), indium zinc oxide, indium tin zirconium oxide, indium gallium oxide, indium gallium zinc oxide, tin oxide, or zinc oxide, or conductive polymers, such as poly(3,4-ethylenedioxythiphene) (PEDOT) or poly(3,4-ethylenedioxythiophene):poly(styrene sulfonate) (PEDOT:PSS). In some embodiments, the transparent conductive material is used to create an in-coupling grating to reduce incoming stray light from the image source. In some embodiments, the transparent conductive material is used to create an out-coupling grating to reduce stray light from external sources and/or to reduce the stray light diffracted to an eye of the user through the out-coupling grating. Other embodiments may use transparent conductive materials in any of the diffractive gratings of the waveguide and/or multiple diffractive gratings of the waveguide.

In some embodiments, the transparent conductive material is used to create a buried diffractive grating. The buried diffractive grating may be generated by patterning the transparent conductive material onto a substrate, such as glass or plastic, and interspersing the transparent conductive material with a resin comprising a low refractive index or a sacrificial material that is to be removed later through sintering or dissolution. The materials may then be covered with a resin that has a refractive index substantially equal to that of the substrate.

The present disclosure addresses the problem of stray light in waveguides used in AR or VR displays by utilizing one or more diffractive gratings fabricated from a transparent conductive material. The thin lines of transparent conductive material used to create the diffractive gratings double as a polarizer, thereby absorbing light that is not polarized in the correct direction while not requiring a separate space on the waveguide on which to be fabricated. Additionally, the methods described herein are versatile to different implementations, such as being able to be fabricated in different patterns or fabricated with different compositions. For instance, ITO may be doped with more indium to create a more absorbent but less transparent diffractive grating or with more tin oxide to create a less absorbent but more transparent grating. This diversification allows the diffractive gratings to be used differently in different locations of a waveguide. For instance, in smaller locations, such as an in-coupling grating, a higher doping of indium would reduce the stray light in the system while having a relatively small effect on the usage of the waveguide as a lens. Conversely, in larger or more central locations, such as in the out-coupling grating, a higher doping of tin oxide would make it easier for a user to see through the lens but would decrease the overall absorption of non-polarized or differently polarized light.

DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1A depicts a diagram of an optical element of a head-mounted display comprising a waveguide with a diffractive grating.

FIG. 1B depicts a diagram of a plurality of diffraction gratings of an optical element of a head-mounted display.

DETAILED DESCRIPTION

Figure 1C:
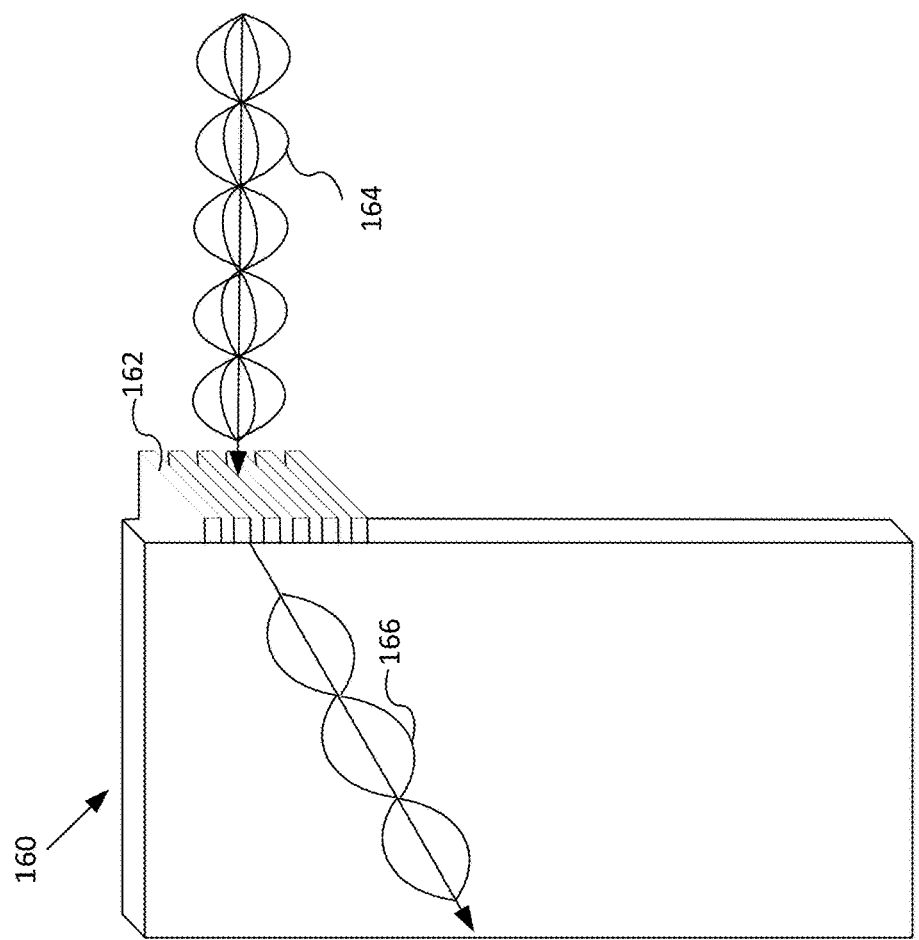
FIG. 1C depicts a diagram of operation of optical elements of a head-mounted display comprising a transparent conductive material in a diffractive grating.

FIG. 1A depicts a diagram of an optical element of a head-mounted display comprising a waveguide with a diffractive grating fabricated using a transparent conductive material. Optical element 100 comprises a first flat surface 102 that is substantially parallel to a second flat surface 104. The first flat surface 102 and second flat surface 104 may comprise a same material, such as glass or plastic, or different materials with substantially equal refractive indices. As used herein, a first refractive index is substantially equal to a second refractive index if the refractive indices differ by less than 0.01. In some embodiments, the refractive indices differ by less than 0.001. In some embodiments, the refractive indices differ by less than 0.0001. In some embodiments, the first material at the first surface is a glass or plastic and the second material at the second surface is a coating that has a refractive index that is substantially equal to the refractive index of the first material.

Optical element 100 comprises a first surface relief grating 106 on top of the first flat surface 102. Optical element 100 additionally comprises a second surface relief grating 107 on top of the first flat surface 102. The second surface relief grating 107 may be fabricated from a different material than the first surface relief grating 106. For instance, the first surface relief grating may be fabricated using laser etching of glass while the second surface relief grating may be fabricated from a transparent conductive material. Other embodiments may include an optical element that comprises a transparent conductive material in the in-coupling grating, out-coupling grating, expansion grating, or any combination thereof. While FIG. 1 depicts the grating comprising the transparent conductive material as a surface relief grating, in other embodiments the transparent conductive material may be used in a buried diffractive grating as described further herein.

FIG. 1A depicts the diffractive grating as a uniform vertical structure with even spacing for the purpose of providing a clear example. FIG. 1-5 are provided as representations of the methods and systems described herein. The elements of FIG. 1-5 are not intended to provide to-scale examples of the methods and systems described herein and embodiments may include different orientations of elements, different sizing of elements, different spacing of elements, or other different configurations of elements. The methods described herein may be used to generate diffraction gratings in a variety of different shapes and structures, including blazed structures, slanted structures, binary structures, analogue structures, or varying depth structures. Additionally, the diffractive gratings may utilize different types of spacings and/or may comprise buried diffractive gratings, as described further herein.

An image source 108 provides an image beam to the optical element 100. The image source may comprise a device configured to project an image beam 110 comprising beams of light corresponding to a plurality of pixels that are to be displayed as an image. The image beam 110 is diffracted by the in-coupling grating and guided through the waveguide through total internal reflection across the first flat surface 102 and the second flat surface 104. The image beam is then diffracted by an out-coupling grating to be displayed to an eye of a user. In this manner, the optical element propagates the image beam through the waveguide and directs the image beam through a surface of the waveguide towards an eye of a user, thereby converting the image beam into an image for viewing by the user.

FIG. 1B depicts a diagram of a plurality of diffraction gratings of an optical element of a head-mounted display. Optical element 120 comprises in-coupling grating 122, expansion grating 124, and out-coupling grating 126. Any of in-coupling grating 122, expansion grating 124, and out-coupling grating 126 may comprise a transparent conductive material as described herein. While FIG. 1B depicts three diffractive gratings, other embodiments may include more or less diffractive gratings. For example, an optical element may include a plurality of expansion gratings including a first expansion grating that expands the image beam in a first direction and a second expansion grating that expands the image beam in a second direction perpendicular to the first direction.

The image source 128 transmits the image beam 130 into optical element 120 at in-coupling grating 122. In-coupling grating 122 diffracts the image beam along optical element 120 through total internal reflection towards expansion grating 124. Expansion grating 124 comprises a grating configured to expand an incoming beam in the plane of the waveguide. The expansion grating may also be configured to redirect the image beam to another direction. For example, in FIG. 1B, the expansion grating redirects the incoming beam from the x-direction to the y-direction towards the out-coupling grating. The out-coupling grating is configured to diffract the expanded beam towards an eyeball of a wearer of the head-mounted display, such as head-mounted display 500 of FIG. 5. In some embodiments, the out-coupling grating is further configured to expand the image beam, such as in a direction perpendicular to the direction expanded by the expansion grating. Thus, if the expansion grating expands the image beam in the x-direction, the out-coupling grating may be configured to expand the image beam in the y-direction, wherein the z-direction is perpendicular to the optical element in a direction of the user's eye.

Figure 1C:
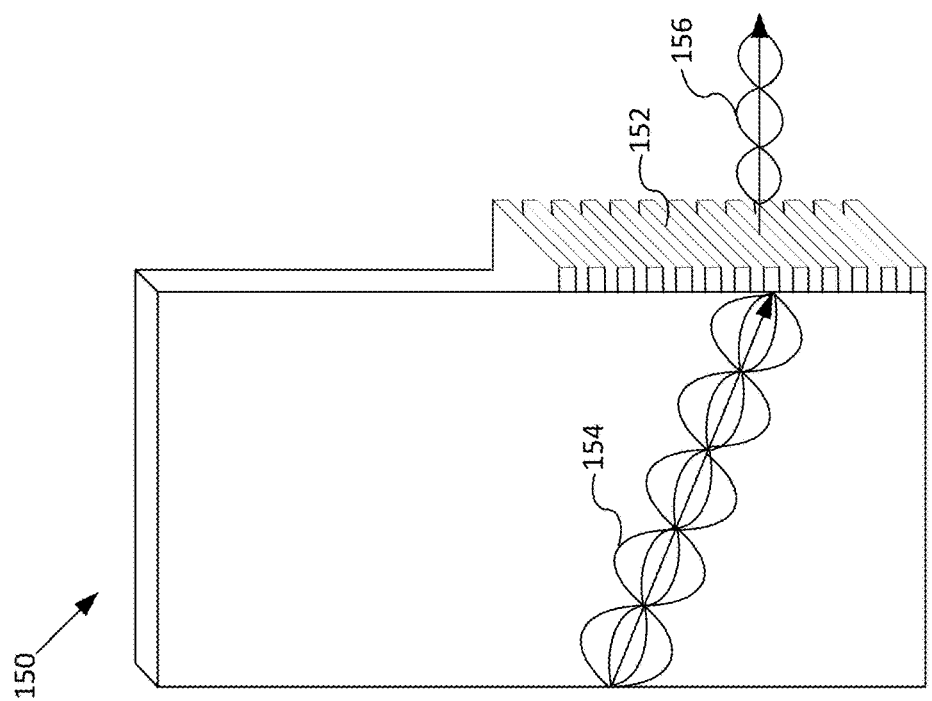

FIG. 1C depicts a diagram of operation of optical elements of a head-mounted display comprising a transparent conductive material in a diffractive grating. Optical element 150 comprises an optical element that uses the transparent conductive material in the out-coupling grating. Optical element 160 comprises an optical element that uses the transparent conductive material in the in-coupling grating. The diagrams of optical element 150 and optical 160 are provided as a visualization of the optical elements and the location, size, and scaling of the diffractive gratings may differ in different implementations. Additionally, while optical element 150 and optical element 160 depict only an out-coupling grating and in-coupling grating respectively, the use of a transparent conductive material as described herein may be applied to any of the diffractive gratings or combination of diffractive gratings in the waveguide.

Optical element 150 comprises diffractive grating 152 as an out-coupling grating fabricated from a transparent conductive material. Light beams 154 comprise light within the waveguide that is polarized in an intended direction, polarized in a different direction, and/or unpolarized. The light may become polarized in a different direction through reflection in the waveguide. Unpolarized light may be a product of external light sources and/or stray light from the image source. When the light beams 154 reach the diffractive grating 152, the light beams 154 are diffracted towards an eye of a user. Additionally, due to the use of the transparent conductive material, parts of light beams 154 that are polarized in an unintended direction or are unpolarized are absorbed by the transparent conductive material, leaving only light beams 156 comprising light beams that are polarized in the intended direction.

As used herein, the intended direction of polarization comprises a designed and/or selected polarization direction. The image source may initially provide an image beam that is polarized in the intended direction. Thus, any light that is not polarized in the intended direction comprises light that has been distorted from the initial image beam or is stray light separate from the image beam. By using the transparent conductive material in the out-coupling grating, the excess light is removed from the image beam that is provided to the eye of the user.

While diffractive grating 152 is depicted as absorbing a beam bouncing through the waveguide through total internal reflection prior to diffraction towards an eye of the user, the diffractive grating 152 may additionally absorb light bouncing through the waveguide in different directions and/or external light prior to the light bouncing through the waveguide. Thus, sunlight may be absorbed by the polarizing of the diffractive grating 152 even prior to entering the waveguide.

Optical element 160 comprises diffractive grating 162 as an in-coupling grating fabricated from a transparent conductive material. Light beams 164 comprise light being projected to the waveguide that is polarized in an intended direction, polarized in a different direction, and/or unpolarized. The light may become unpolarized due to imperfections in the light source or reflection off other materials. Unpolarized light may be a product of external light sources and/or stray light from the image source. When the light beams 164 reach diffractive grating 162, light beams 164 are diffracted into the waveguide. Additionally, due to the use of the transparent conductive material, parts of light beams 164 that are polarized in an unintended direction or are unpolarized are absorbed by the transparent conductive material, leaving only light beams 166 comprising light beams that are polarized in the intended direction.

While diffractive grating 162 is depicted as absorbing a beam prior to the beam entering the waveguide, the diffractive grating 162 may additionally absorb light bouncing through the waveguide in different directions. Thus, stray light bouncing through the waveguide may still be absorbed by diffractive grating 162 in addition to diffractive grating 162 acting as an in-coupling grating.

Figure 2:
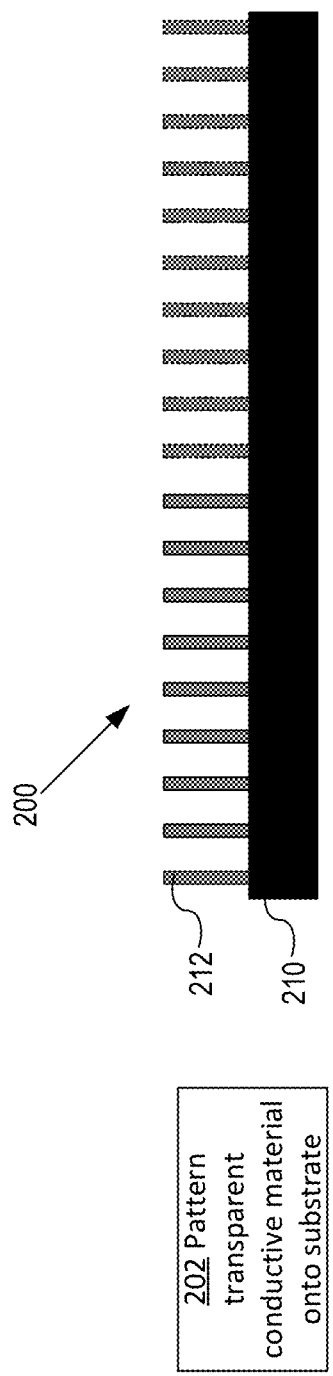
FIG. 2 depicts an example of fabricating a diffractive grating in an optical element using a transparent conductive material.
Figure 3:
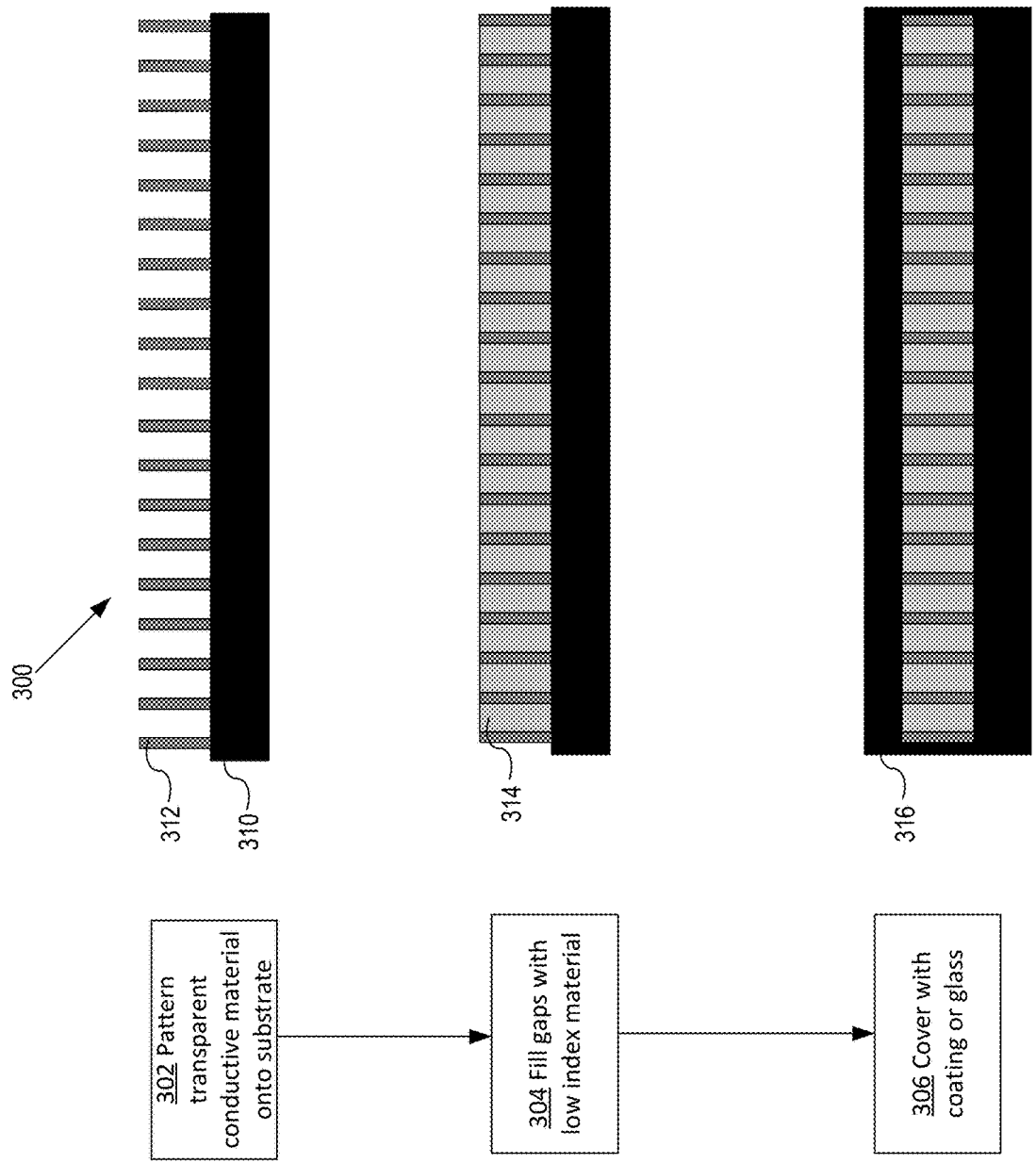
FIG. 3 depicts an example of fabricating a buried diffractive grating in an optical element using a transparent conductive material and a low-refractive index material.
Figure 4:
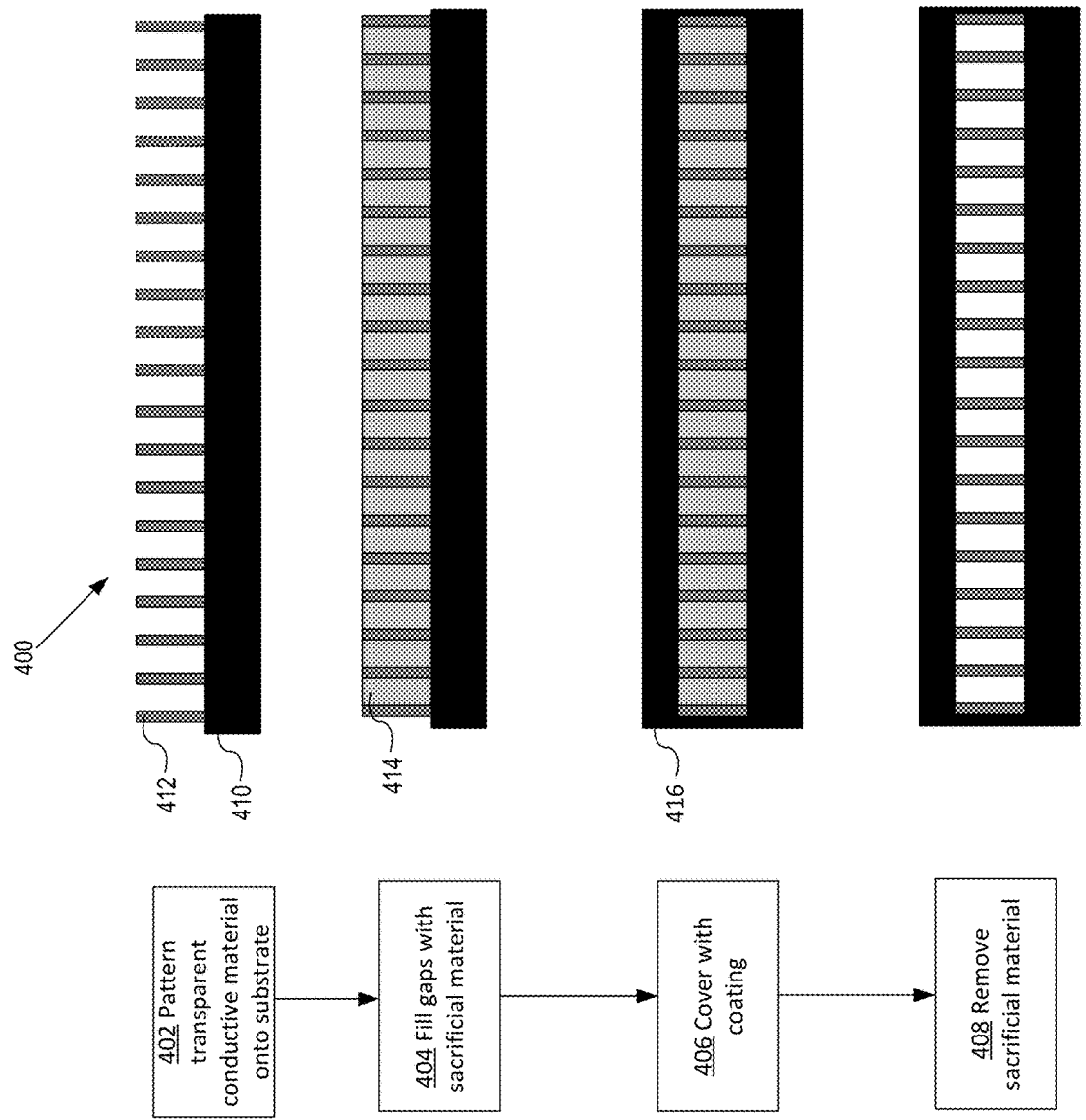
FIG. 4 depicts an example of fabricating a buried diffractive grating in an optical element using a transparent conductive material and a sacrificial material.

FIGS. 2-4 depict different methods of creating diffractive gratings using a transparent conductive material for use in optical elements for head-mounted displays. The diffractive gratings of FIG. 1 may be generated using any of the methods described in FIGS. 2-4.

FIG. 2 depicts an example of fabricating a diffractive grating in an optical element using a transparent conductive material. Optical element 200 includes substrate 210. Substrate 210 may comprise a material with a high refractive index for fabricating the diffractive grating onto, such as glass or plastic. At step 202, transparent conductive material 212 is patterned onto the substrate. Transparent conductive material 212 may comprise a transparent conductive oxide, such as fluorinated tin oxide, indium tin oxide, aluminum zinc oxide, indium zinc oxide, indium tin zirconium oxide, indium gallium oxide, indium gallium zinc oxide, tin oxide, or zinc oxide, or a conductive polymer, such as poly(3,4-ethylenedioxythiphene) (PEDOT) or poly(3,4-ethylenedioxythiophene):poly(styrene sulfonate) (PEDOT:PSS).

In some embodiments, the transparent conductive material is tuned to a particular implementation. For instance, indium tin oxide may be doped with more indium to create a more absorbent but less transparent diffractive grating or with more tin oxide to create a less absorbent but more transparent grating. This diversification allows the diffractive gratings to be used differently in different locations. For instance, in smaller locations, such as an in-coupling grating, a higher doping of indium would reduce the stray light in the system while having a relatively small effect on the usage of the waveguide as a lens. Conversely, in larger or more central locations, such as in the out-coupling grating, a higher doping of tin oxide would make it easier for one to see through the lens but would decrease the overall absorption of non-polarized or differently polarized light. In some embodiments, different diffractive gratings on a waveguide include different transparent conductive materials or different chemical makeups of a same transparent conductive material. For instance, if both the in-coupling and out-coupling gratings are fabricated with indium tin oxide, the in-coupling grating may be fabricated with indium tin oxide that is doped with indium to give the indium tin oxide in the in-coupling grating a higher percentage of indium than the indium tin oxide coupling grating. Additionally or alternatively, the out-coupling grating may be fabricated with indium tin oxide that is doped with tin oxide for the same or similar effect.

The transparent conductive material 212 may be patterned onto substrate 210 in any of a plurality of designs, including blazed patterns, slanted patterns, binary patterns, analogue structures, or varying depth structures. Techniques for patterning transparent conductive material 212 onto substrate 210 include any of electron beam lithography, interference lithography, nanoimprint lithography, hot embossing, photolithography, focused ion beams, laser ablation, physical vapor deposition, atomic layer deposition, chemical vapor deposition, nanoparticle inks, spin-casting, dip-coating, or any other lithography, patterning, coating techniques or combination thereof. For instance, a coating technique, such as chemical vapor deposition may be used to coat the substrate with the transparent conductive material. Following the coating of the substrate, strips of the transparent conductive material may be removed through a lithographic technique, such as electron beam lithography of a resist followed by an etching and lift-off step.

In some embodiments, the transparent conductive material is patterned onto the substrate in a manner that produces gaps between each strip. For instance, some lithographic techniques provide a thin layer of the material between each of the strips to provide additional support. The transparent conductive material may be applied without the thin layer and/or the thin layer may be removed through ablation techniques to ensure that the spaces between the transparent conductive material do not include any of the transparent conductive material.

FIG. 3 depicts an example of fabricating a buried diffractive grating in an optical element using a transparent conductive material and a low-refractive index material. Optical element 300 includes substrate 310. Substrate 310 may comprise a material with a high refractive index for fabricating the transparent conductive material as a buried diffractive grating onto, such as glass or plastic. At step 302, transparent conductive material 312 is patterned onto the substrate using the techniques described herein. Transparent conductive material 312 may comprise a transparent conductive oxide, such as fluorinated tin oxide, indium tin oxide, aluminum zinc oxide, indium zinc oxide, indium tin zirconium oxide, indium gallium oxide, indium gallium zinc oxide, tin oxide, or zinc oxide, or a conductive polymer, such as poly(3,4-ethylenedioxythiphene) (PEDOT) or poly (3,4-ethylenedioxythiophene):poly(styrene sulfonate) (PEDOT:PSS). At step 304, a low index material 314 is patterned onto the substrate. Low index material 314 may comprise a material with a refractive index that is substantially lower than the refractive index of substrate 310, such as lithium fluoride, calcium fluoride, magnesium fluoride, or any other low refractive index optical resin. Substantially lower, as used herein, refers to a difference of 0.5 or greater between the two indices.

The low index material 314 may be patterned onto substrate 310 in between the strips of transparent conductive material 312 using lithographic and/or patterning techniques, such as electron beam lithography, interference lithography, nanoimprint lithography, hot embossing, photolithography with a pattern transfer, reactive ion etching and deposition of the low index material, physical vapor deposition, atomic layer deposition, chemical vapor deposition, application of nanoparticle inks, spin casting, dip-coating, or any combination of techniques, such as coating the low index material 314 onto the substrate on top of the transparent conductive material 312 and removing excess material through lithographic techniques.

At step 306, a high index coating 316 or separate sheet of glass or plastic is applied to cover transparent conductive material 312, low index material 314, and substrate 316. High index coating 316 may comprise any of cubic zirconium oxide, titanium oxide, aluminum oxide, diamond, hafnium oxide, tantalum oxide, zinc oxide, or any other high-index resins. In some embodiments, high index coating 316 is selected to have a refractive index that is substantially equal to the refractive index of substrate 310. Processes for coating the high-index coating 316 onto the transparent conductive material 312, low index material 314, and substrate 316 include any of physical vapor deposition, atomic layer deposition, chemical vapor deposition, application of nanoparticle inks, spin casting, or dip-coating. Additionally or alternatively, a sheet of glass or plastic may be laser bonded to the transparent conductive material 312 and low index material 314. An additional processing step may include polishing or otherwise thinning the sheet of glass to a desired thickness.

FIG. 4 depicts an example of fabricating a buried diffractive grating in an optical element using a transparent conductive material and a sacrificial material. Optical element 400 includes substrate 410. Substrate 410 may comprise a material with a high refractive index for fabricating the buried diffractive grating onto, such as glass or plastic. At step 402, transparent conductive material 412 is patterned onto the substrate. Transparent conductive material 412 may comprise a transparent conductive oxide, such as fluorinated tin oxide, indium tin oxide, aluminum zinc oxide, indium zinc oxide, indium tin zirconium oxide, indium gallium oxide, indium gallium zinc oxide, tin oxide, or zinc oxide, or a conductive polymer, such as poly(3,4-ethylenedioxythiphene) (PEDOT) or poly(3,4-ethylenedioxythiophene):poly(styrene sulfonate) (PEDOT:PSS).

At step 404, sacrificial material 414 is patterned onto the substrate in between the strips of transparent conductive material. Sacrificial material 414 may comprise a soluble or dissolvable material, such as a photoresist, a water-soluble polymer or material, or organic-solvent soluble polymer or material. One example of sacrificial material includes water soluble polyvinyl alcohol.

At step 406, a high index coating 416 is applied to cover transparent conductive material 412, sacrificial material 414, and substrate 410. High index coating 416 may comprise any of cubic zirconium oxide, titanium oxide, aluminum oxide, diamond, hafnium oxide, tantalum oxide, zinc oxide, or any other high-index resins. In some embodiments, high index coating 416 is selected to have a refractive index that is substantially equal to the refractive index of substrate 410. Processes for coating the high-index coating onto the transparent conductive material 412, sacrificial material 414, and substrate 240 include any of physical vapor deposition, atomic layer deposition, chemical vapor deposition, application of nanoparticle inks, spin casting, or dip-coating.

At step 408, after the high index coating has been applied to cover transparent conductive material 412, sacrificial material 414, and substrate 240, the sacrificial material is removed. For example, a sintering or dissolution process may be applied to optical element 400 to remove sacrificial material.

The fabrication techniques described herein with respect to FIG. 3-4 provide a wide array of benefits. One such benefit is that buried diffractive gratings can be fabricated in different structures within the optical element, such as blazed structures, slanted structures, binary structures, analogue structures, or varying depth structures. In particular, varying depth structures are not possible with surface relief gratings. In contrast, buried diffractive gratings can be fabricated at different depths depending on need, with some embodiments including buried diffractive gratings in a center of the optical element and other embodiments including buried diffractive gratings closer to one surface of the optical element than the other. In addition, a single diffractive grating can be fabricated with portions of the buried diffractive grating at different depths and/or different buried diffractive gratings in a single optical element can be fabricated at different depths, such as an in-coupling grating at a first depth and an out-coupling grating at a second depth.

Additionally, the use of a transparent conductive material to fabricate diffractive gratings provides absorption of stray light in the waveguide without requiring additional structures to be fabricated onto the surface of the waveguide which would be limited in location and may negatively impact visibility through the waveguide. While transparent conductive materials would block light if they covered the waveguide, the thin strips of material used in a diffractive grating has minimal impact on the transparency of the waveguide.

Figure 5:
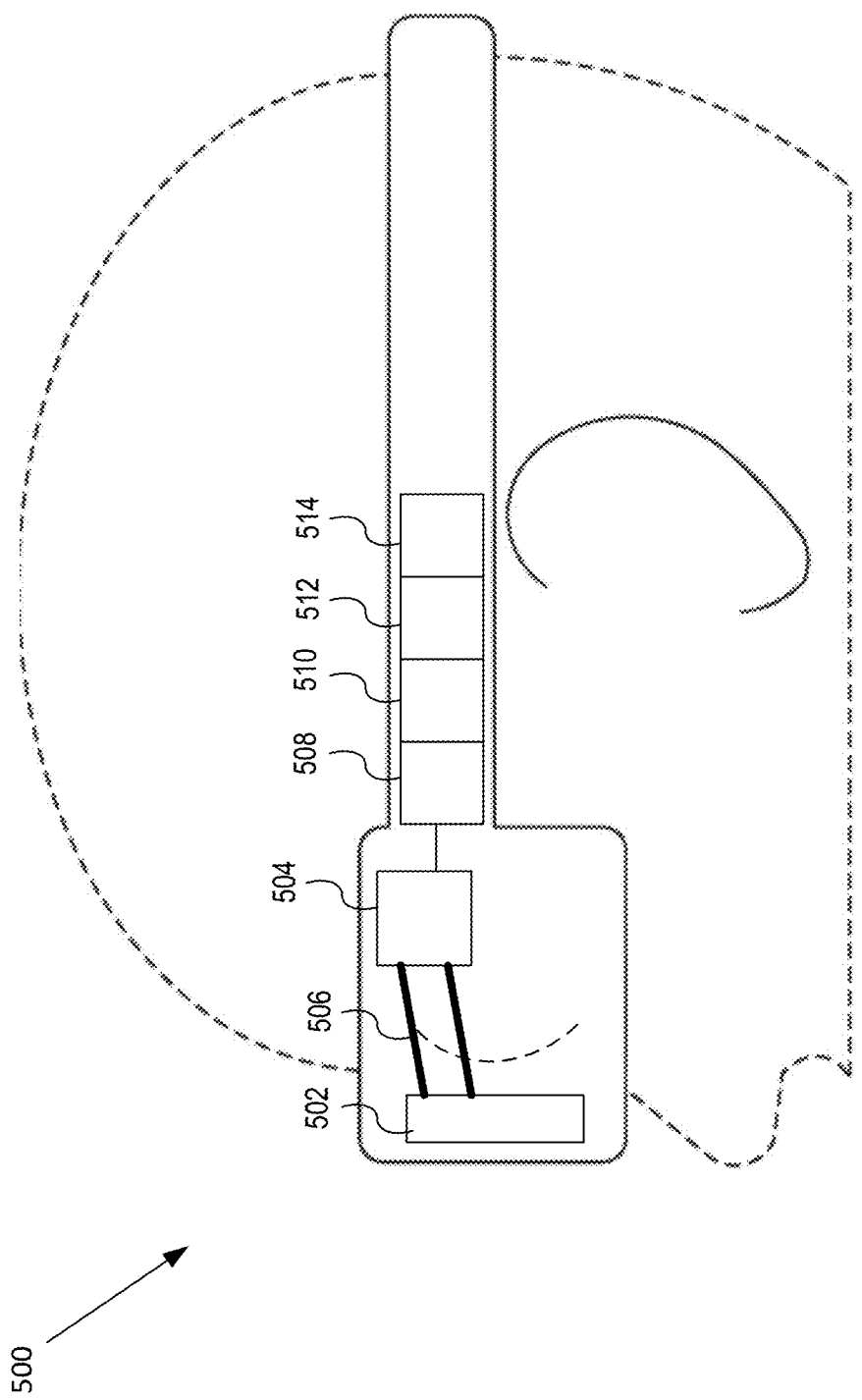
FIG. 5 depicts an example of a head-mounted display comprising one or more optical elements with a buried diffractive grating.

FIG. 5 depicts an example of a head-mounted display comprising one or more optical elements with a diffractive grating fabricated using a transparent conductive material. Head-mounted display 500 comprises optical element 502, image source 504, control circuitry 508, memory 510, network adaptor 512, and power source 514. Optical element 502 comprises an optical element, such as a lens, which sits in front of an eye of a user. Image source 504 provides an image beam 506 to the optical element which is diffracted by a buried diffractive grating and displayed to the eye of the user. Control circuitry 508 may be based on any suitable processing circuitry, such as one or more microprocessors, microcontrollers, digital signal processors, programmable logic devices, field-programmable gate arrays (FPGAs), application-specific integrated circuits (ASICs), etc., and may include a multi-core processor (e.g., quad-core). Control circuitry 508 may be configured to generate one or more images for display through the head-mounted display and instruct image source 504 to produce one or more image beams corresponding to the one or more images. Memory 510 may be any device for storing electronic data, such as random-access memory, solid state devices, quantum storage devices, hard disk drives, non-volatile memory or any other suitable fixed or removable storage devices, and/or any combination of the same. Memory 510 may store data defining images for display by the head-mounted display. Network adaptor 512 comprises circuitry that connects the head-mounted display to one or more other devices over a network. Network adaptor 512 may comprise wires and/or busses connected to a physical network port, e.g. an ethernet port, a wireless WiFi port, cellular communication port, or any other type of suitable physical port. Power source 514 comprises a source of power to the image source 504, control circuitry 508, memory 510, and/or network adaptor 512, such as a battery, solar generator, or wired power source.

What is claimed is:

1. A head-mounted display, comprising:
    an image source configured to provide an image beam, wherein:
        the image beam comprises a plurality of light beams, wherein each light beam of the plurality of light beams has a respective wavelength, and wherein all light beams of the plurality of light beams have a particular polarization direction;
    an optical element comprising a diffractive grating, the diffractive grating comprising a transparent conductive material, wherein the transparent conductive material:
        filters light that is polarized in any direction that is different from the particular polarization direction; and
        transmits all light beams of the plurality of light beams that have the particular polarization direction into the optical element;
    wherein the optical element is configured to convert the image beam into an output image by diffracting the image beam through an in-coupling grating, propagating the image beam through the optical element through internal reflection, and directing the image beam through a surface of the optical element by an out-coupling grating.

2. The head-mounted display of claim 1, wherein the diffractive grating comprising the transparent conductive material is the out-coupling grating.

3. The head-mounted display of claim 1, wherein the transparent conductive material comprises fluorinated tin oxide, indium tin oxide, aluminum zinc oxide, indium zinc oxide, indium tin zirconium oxide, indium gallium oxide, indium gallium zinc oxide, tin oxide, or zinc tin oxide.

4. The head-mounted display of claim 1, wherein the transparent conductive material comprises a first transparent conductive material in the in-coupling grating and a second transparent conductive material in the out-coupling grating that comprises a different chemical makeup than the first transparent conductive material.

5. The head-mounted display of claim 4, wherein the first transparent conductive material and the second transparent conductive material comprise indium tin oxide and wherein the first transparent conductive material comprises a higher percentage of indium than the second transparent conductive material.

6. The head-mounted display of claim 1, wherein the diffractive grating comprises a buried diffractive grating spaced from and disposed between a first flat surface of the optical element and a second flat surface of the optical element opposing the first flat surface.

7. The head-mounted display of claim 1, wherein the diffractive grating comprising the transparent conductive material filters unpolarized light.

8. A method for producing a waveguide for a head-mounted display comprising:
    patterning a diffractive grating comprising a transparent conductive material onto a second transparent material, to produce the diffractive grating configured to:
        filter light that is polarized in any particular direction that is different from a particular polarization direction; and
        transmits light beams of the particular polarization direction.

9. The method of claim 8, further comprising:
    patterning, in between the transparent conductive material, a third material comprising a refractive index substantially lower than the refractive index of the second transparent material;
    covering the transparent conductive material and the third material with a fourth material comprising a refractive index substantially equal to the second transparent material.

10. The method of claim 8, further comprising patterning, in between the transparent conductive material, a sacrificial material;
    covering the transparent conductive material and the sacrificial material with a third material comprising a refractive index substantially equal to the second transparent material;
    performing sintering or dissolution to form pockets of nonsolid pockets in place of the sacrificial material.

11. The method of claim 8, wherein the diffractive grating comprising the transparent conductive material is an out-coupling grating.

12. The method of claim 8, wherein the transparent conductive material comprises fluorinated tin oxide, indium tin oxide, aluminum zinc oxide, indium zinc oxide, indium tin zirconium oxide, indium gallium oxide, indium gallium zinc oxide, tin oxide, or zinc tin oxide.

13. The method of claim 8, wherein the diffractive grating comprises an in-coupling grating and an out-coupling grating.

14. The method of claim 13, wherein the transparent conductive material comprises a first transparent conductive material in the in-coupling grating and a second transparent conductive material in the out-coupling grating that comprises a different chemical makeup than the first transparent conductive material.

15. The method of claim 14, wherein the first transparent conductive material and the second transparent conductive material comprise indium tin oxide and wherein the first transparent conductive material comprises a higher percentage of indium than the second transparent conductive material.

16. A waveguide for a head-mounted display produced by:
    patterning a diffractive grating comprising a transparent conductive material onto a second transparent material, wherein the diffractive grating comprising the transparent conductive material is configured to:
        filter light that is polarized in any particular direction that is different from a particular polarization direction; and transmit light beams of the particular polarization direction.

17. The waveguide of claim 16, wherein the waveguide is further produced by:
patterning, in between the transparent conductive material, a third material comprising a refractive index substantially lower than the refractive index of the second transparent material;
covering the transparent conductive material and the third material with a fourth material comprising a refractive index substantially equal to the second transparent material.

18. The waveguide of claim 16, wherein the waveguide is further produced by:
patterning, in between the transparent conductive material, a sacrificial material;
covering the transparent conductive material and the sacrificial material with a third material comprising a refractive index substantially equal to the second transparent material;
performing sintering or dissolution to form pockets of nonsolid pockets in place of the sacrificial material.

19. The waveguide of claim 16, wherein the diffractive grating comprising the transparent conductive material is an out-coupling grating.

20. The waveguide of claim 16, wherein the transparent conductive material comprises fluorinated tin oxide, indium tin oxide, aluminum zinc oxide, indium zinc oxide, indium tin zirconium oxide, indium gallium oxide, indium gallium zinc oxide, tin oxide, or zinc tin oxide.

* * * * *